United States Patent
Ha

(10) Patent No.: US 8,436,940 B2
(45) Date of Patent: May 7, 2013

(54) CONVERTING IMAGE FORMAT

(75) Inventor: Kwang Hee Ha, Gumi-si (KR)

(73) Assignee: LG Electronics Inc., Seoul (KR)

( * ) Notice: Subject to any disclaimer, the term of this patent is extended or adjusted under 35 U.S.C. 154(b) by 876 days.

(21) Appl. No.: 12/299,060

(22) PCT Filed: May 2, 2007

(86) PCT No.: PCT/KR2007/002142
§ 371 (c)(1),
(2), (4) Date: Oct. 30, 2008

(87) PCT Pub. No.: WO2007/126291
PCT Pub. Date: Nov. 8, 2007

(65) Prior Publication Data
US 2009/0097544 A1    Apr. 16, 2009

(30) Foreign Application Priority Data
May 2, 2006 (KR) .......................... 10-2006-0039573

(51) Int. Cl.
*H04N 5/46* (2006.01)

(52) U.S. Cl.
USPC ........... 348/556; 348/441; 348/445; 348/553; 348/564; 348/569; 382/299

(58) Field of Classification Search ......... 375/240.01–240.29; 725/131; 382/223, 299; 348/207.26, 441, 553, 555, 348/556, 564, 565, 569, 445
See application file for complete search history.

(56) References Cited

U.S. PATENT DOCUMENTS

| | | | |
|---|---|---|---|
| 6,539,120 B1 * | 3/2003 | Sita et al. | 382/233 |
| 6,600,840 B1 | 7/2003 | McCrossin et al. | 382/302 |
| 7,010,176 B2 * | 3/2006 | Kusunoki | 382/299 |
| 2005/0128349 A1 | 6/2005 | Takamori et al. | 348/441 |
| 2005/0140790 A1 * | 6/2005 | Min et al. | 348/207.99 |
| 2005/0149985 A1 * | 7/2005 | Okamoto | 725/131 |
| 2005/0190295 A1 * | 9/2005 | Mizutome et al. | 348/553 |
| 2005/0259752 A1 * | 11/2005 | Iwata et al. | 375/240.26 |
| 2006/0015903 A1 | 1/2006 | MacBeth et al. | 725/46 |
| 2006/0071920 A1 | 4/2006 | Ishimatsu et al. | 345/204 |
| 2006/0291569 A1 * | 12/2006 | Kabuto et al. | 375/240.25 |

FOREIGN PATENT DOCUMENTS

| | | |
|---|---|---|
| EP | 1 119 203 A2 | 7/2001 |
| KR | 10-2004-0093777 A | 11/2004 |
| KR | 10-2006-0074784 A | 7/2006 |

OTHER PUBLICATIONS

International PCT Search Report dated Aug. 20, 2007.
European Search Report dated Nov. 27, 2009.
Korean Office Action dated May 8, 2007.
European Patent Office Communication dated Apr. 19, 2010.

* cited by examiner

*Primary Examiner* — Sath V Perungavoor
*Assistant Examiner* — Nathnael Aynalem
(74) *Attorney, Agent, or Firm* — Ked & Associates, LLP

(57) ABSTRACT

An apparatus for converting an image format of data and a method thereof is disclosed. An apparatus for converting an image format of data comprises an image converter (126) for converting parameters of the image format, an encoder (127) for encoding the format changed data and a file system converter (128) for changing the encodes data into a file system supported by an external interface (121). Also, a method for converting an image format of data comprises converting the image format of data into another image format, encoding the format changed data into a compressed data, and converting data into a file system which an external interface supports.

18 Claims, 6 Drawing Sheets

CONVERTING IMAGE FORMAT

TECHNICAL FIELD

The present disclosure relates to converting image format.

BACKGROUND ART

Heretofore, a digital broadcasting receiver such as a digital television and a set-top box (STB) having a digital broadcasting reception function receives digital TV broadcasting data of an Advanced Television Systems Committee (ATSC) MPEG-2 Transport Streams (TSs). The digital broadcasting receiver performs a MPEG decoding and a signal processing for the received digital TV broadcasting data, and outputs video data of high picture quality and audio data of high speech quality.

Further, a digital broadcasting receiver with a Personal Video Recording (hereinafter, referred to as PVR) function has also been developed and commercialized. The PVR can store received digital TV broadcasting data of ATSC MPEG-2 TSs in a high capacity hard disk, and reproduce the stored digital TV broadcasting data at a time desired by a user.

However, a mobile terminal such as a mobile phone, a Personal Digital Assistant (PDA) and a Digital Multimedia Broadcasting (DMB) device has a lower resolution and smaller size than those of conventional digital broadcasting format.

DISCLOSURE OF INVENTION

Advantageous Effects

Accordingly, the present invention is directed to converting image format that substantially obviates one or more problems due to limitations and disadvantages of the related art.

An object of the present invention is to provide a method/device that can directly or automatically convert high resolution and large size digital TV broadcasting programs into low resolution and small size programs.

Another object of the present invention is to provide a digital television and method that can solve at least the above problems and/or disadvantages and to provide at least the advantages described hereinafter.

A further object of the present invention is to provide a digital television and method that can convert first received data format into a different second converted data format so that the received data can be transmitted in the second format for playback in an external apparatus.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for converting an image format of data comprising converting the image format of data into another image format, encoding the format changed data into a compressed data, and converting the encoded data into a file system which an external interface supports.

To further achieve the above objects in a whole or in part, according to another aspect of the invention, there is provided an apparatus for converting an image format of data comprising an image converter for converting parameters of the image format, an encoder for encoding the format changed data and a file system converter for changing the encoded data into a file system supported by an external interface.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

Embodiments according to the invention can be applied to various types of receivers such as STBs and digital TVs with PVR functions, which receive digital TV broadcasting data and store the received digital TV broadcasting data in a storage device such as a hard disk.

Figure 1:
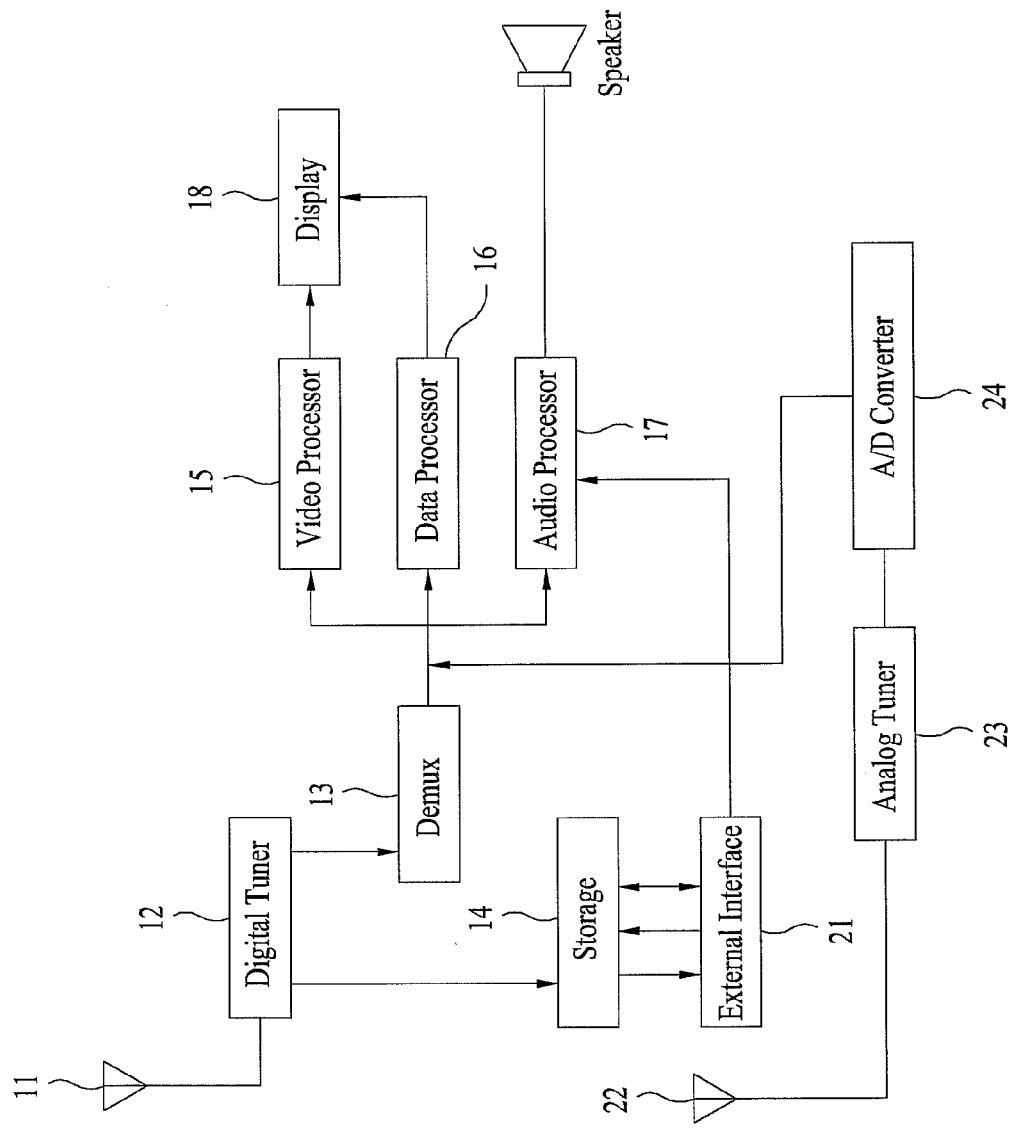
FIG. 1 illustrates a block diagram of a receiver according to one embodiment of the present invention.

FIG. 1 is a block diagram of a receiver according to one embodiment of the present invention. As shown in FIG. 1, the receiver can include a digital antenna 11, a digital tuner 12, an demultiplexer 13, storage such as a personal video recorder (PVR) 14, a video processor 15, a data processor 16, an audio processor 17, a display 18, and a speaker.

As shown in FIG. 1, the receiver can further include a analog antenna 22, an analog tuner 23, and an A/D converter 24. A mobile terminal (not shown) can be coupled to the receiver through an external interface 21.

First of all, the digital antenna 11 receives broadcast signals as a form of ATSC MPEG-2 streams by tuning the digital tuner 12 according to a user request to select a digital TV broadcasting channel. The digital tuner converts the received MPEG-2 streams into MPEG-2 Transport Streams (TSs). The demultiplxer 13 decodes the MPEG-2 TSs into high resolution (e.g., 1920*1080i pixels) data for large screen television. The video processor 15 can signal process the decoded video data to output video signals of high picture quality, and the audio processor 17 can perform signal processing and amplification for the decoded audio data to output audio signals of high speech quality. The ATSC MPEG-2 TSs of the tuned digital TV broadcasting program can also be stored in the storage 14 such as PVRs.

Moreover, the receiver can receive analog broadcasting programs by analog antenna 22 and analog tuner 23 and converts the analog signals into digital signals through the A/D converter 24. The A/D converted signals are processed using the same video 15, data 16 and audio processors 17.

Figure 2:
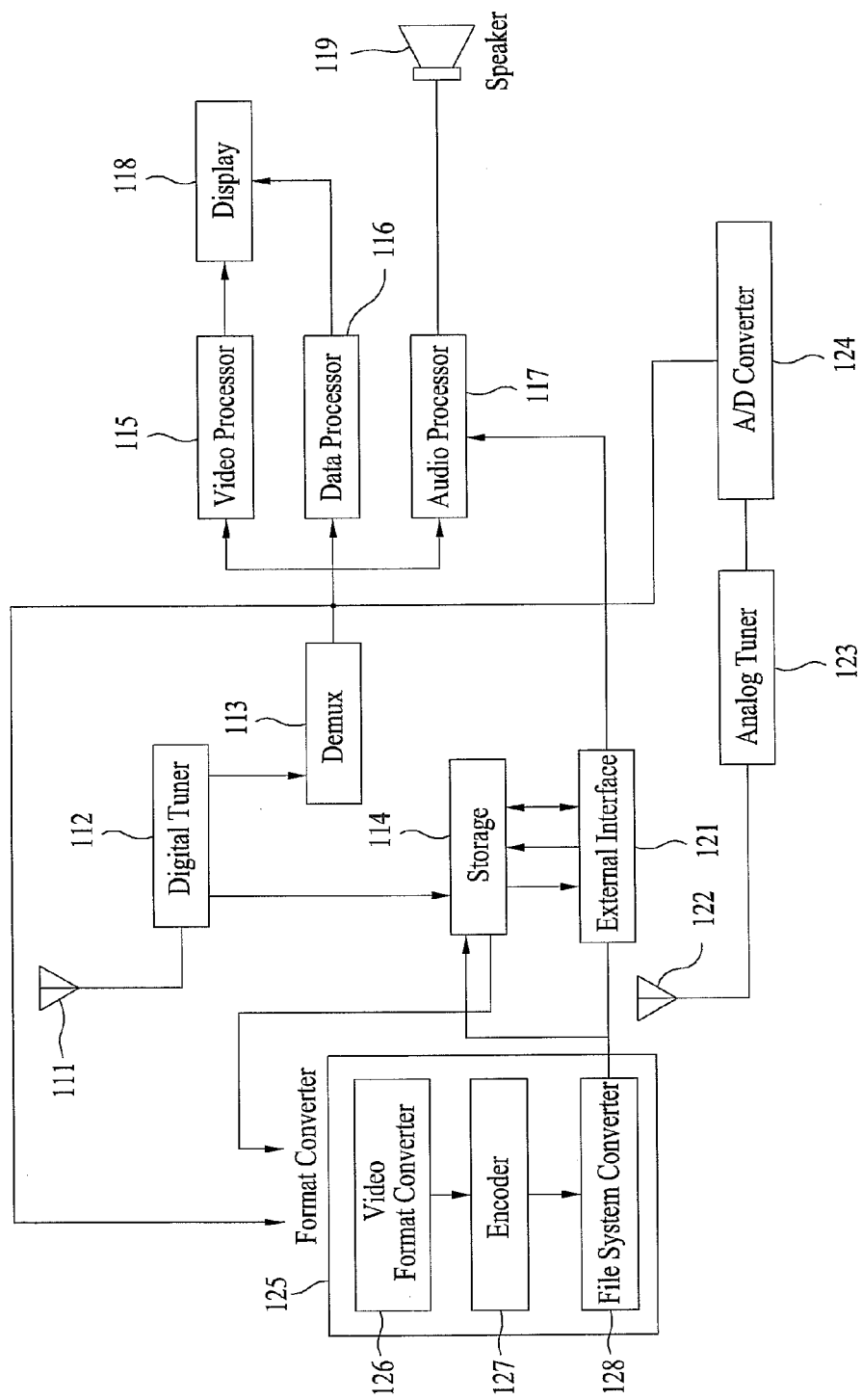
FIG. 2 illustrates a block diagram of a receiver according to another embodiment of the present invention.

FIG. 2 includes a format converter 125 in addition to the elements illustrated on FIG. 1. The video format converter 126 can perform an image downsizing operation of converting the video data decoded by the demultiplexer 113, e.g., a picture sequence with a resolution of 1920.times.1080 pixels, to a picture sequence with a reduced resolution (e.g., 352.times.288 pixels), which can be employed by the DMB receiver, or the H.264 compressed format. In addition, the video format converter 126 can perform an aspect ratio control operation for adjusting the aspect ratio of the video data to be proper for the aspect ratio of an LCD screen with a reduced size (e.g., 2.2, 3.5 or 7 inch), which the mobile terminal can employ. For example, an aspect ratio for conversion may be preset or modified through an environment setup menu, which is provided by the controller 14 through an already embedded Graphic User Interface (GUI), as conversion conditions.

The audio also can be converted from the audio data decoded by the demultiplexer 113, e.g., 5.1 CH Pulse Code Modulation (PCM) audio data, to data of a format that, e.g., the DMB device can support, i.e., 2 CH PCM audio data.

The encoder 127 can encode the video data converted by the video format converter 126 into, e.g., a DMB format video data according to a H.264/AVC standard. The encoder 127 also can encode the audio data converted by the video format converter 126 into, e.g., a DMB format audio data according to an ISO/IEC 14496-3 BSAC standard.

The file system converter 128 converts the encoded data by the encoder 127 into a file system that the external interface 121 supports. The external interface includes Universal Serial Bus (USB), IEEE 1394, and EPF.

The MPEG-2 TSs can be stored in the storage 114. For example, the storage 114 separately stores the format converted MPEG-2 TSs and the ATSC MPEG-2 TSs of the digital TV broadcasting format outputted from the demultiplexer 113 as different data files.

Figure 3:
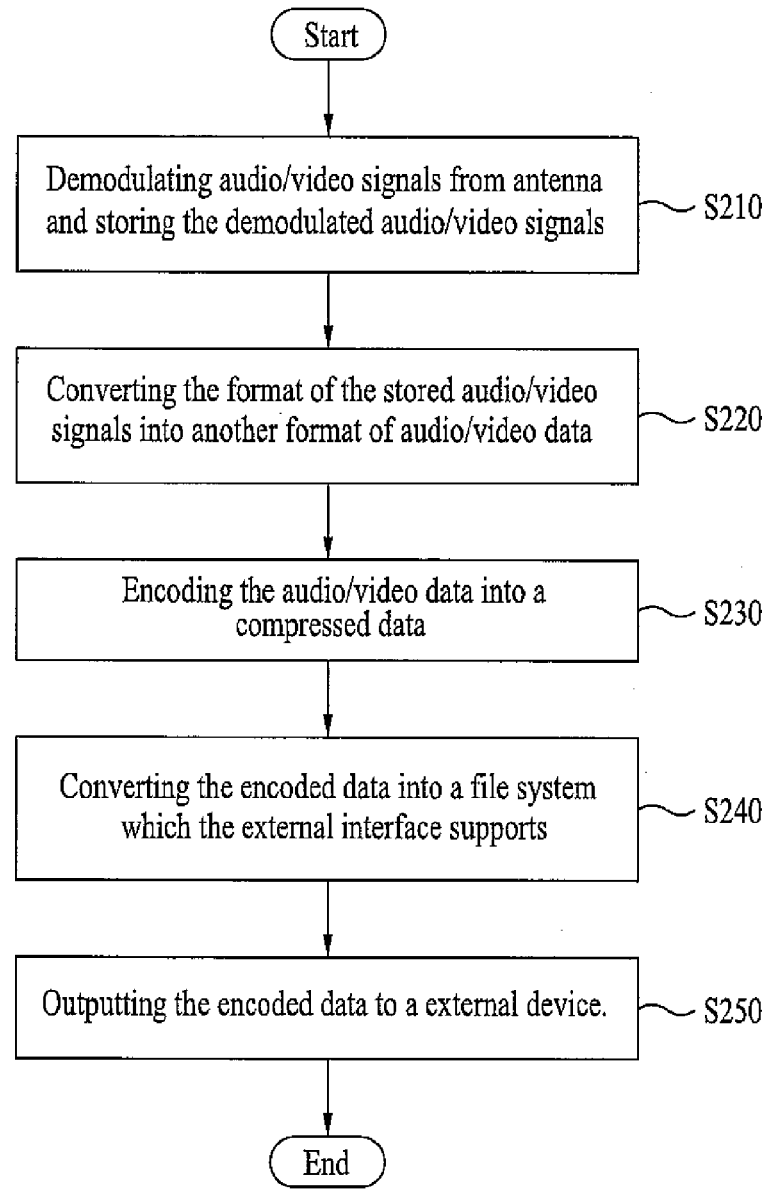
FIG. 3 illustrates a flowchart of converting image format.

FIG. 3 illustrates a flowchart of converting image format according to one embodiment of the invention. The embodiment of the method of FIG. 3 can be applied to and will be described using the receiver shown in FIG. 2. However, the invention is not intended to be so limited.

The digital tuner 112 tunes one random digital TV broadcasting channel according to a user's request. The ATSC decoder (not shown) can demodulate the audio/video signals from the antenna 111 and stores at the storage 114 the demodulated audio/video signals (S210). The video format converter 126 converts the format of the stored audio/video signals into another format of audio/video signals (S220). The encoder (127) encodes the audio/video data into a compressed data (S230). The file system converter 128 converts the encoded data into a file system which the external interface 121 supports (S240). The external interface 121 outputs the encoded data to an external device (not shown).

Figure 4:
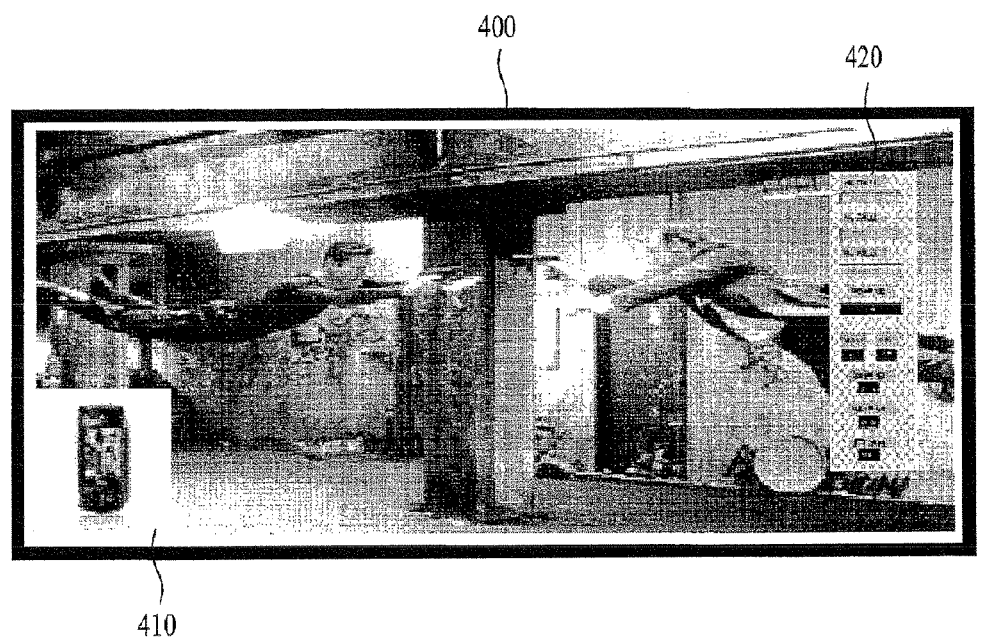
FIG. 4 illustrates a television screen displaying a control panel.

FIG. 4 illustrates a television screen displaying a control panel. The television main screen 400 includes preview window 410 and control panel 420. The preview window 410 provides thumbnail images of the format-converted image signals before the format conversion settings are applied to a specific mobile terminal. The control panel 420 is enlarged in FIG. 5 and FIG. 6.

Figure 5:
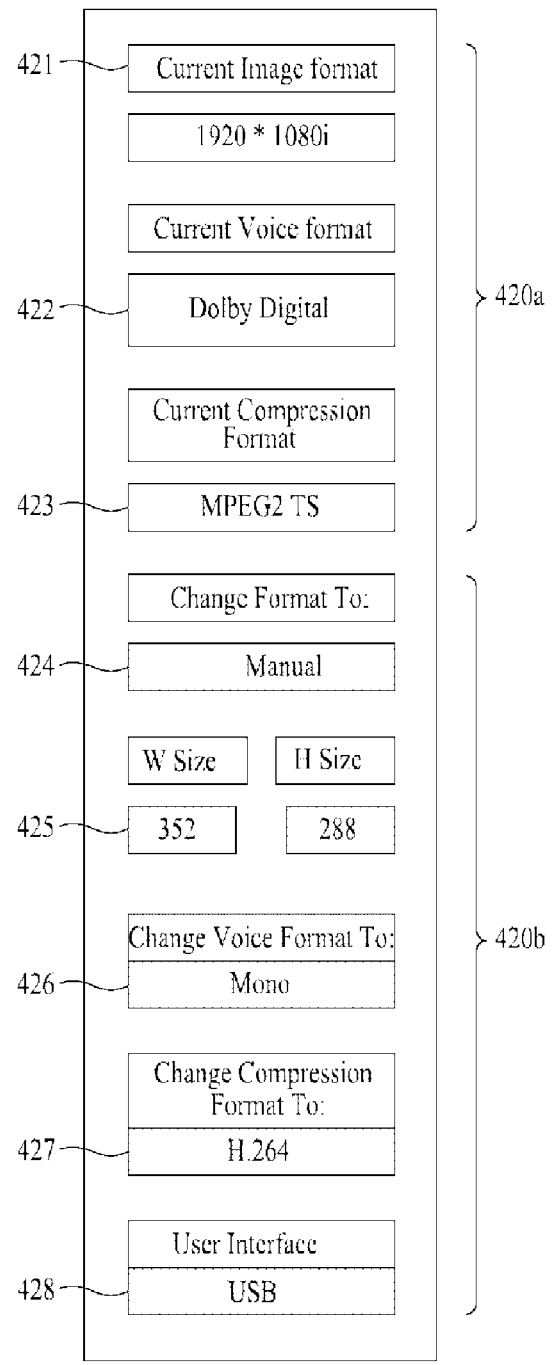
FIG. 5 illustrates the control panel illustrated on FIG. 4.

FIG. 5 illustrates the control panel illustrated on FIG. 4. The control panel 420 comprises a current image format part 420a and a changeable format part 420b. The current image format part 420a further comprises a current image format 421, current voice (audio) format 422, and current compression format 423. The changeable format part further comprises change format to manual or automatic 424, width and height sizes 425, change voice format to mono or surround 426, change compression format to MPEG-2 TS or H.264 427, and user interface as USB, IEEE 1394 or EPF 428.

Figure 6:
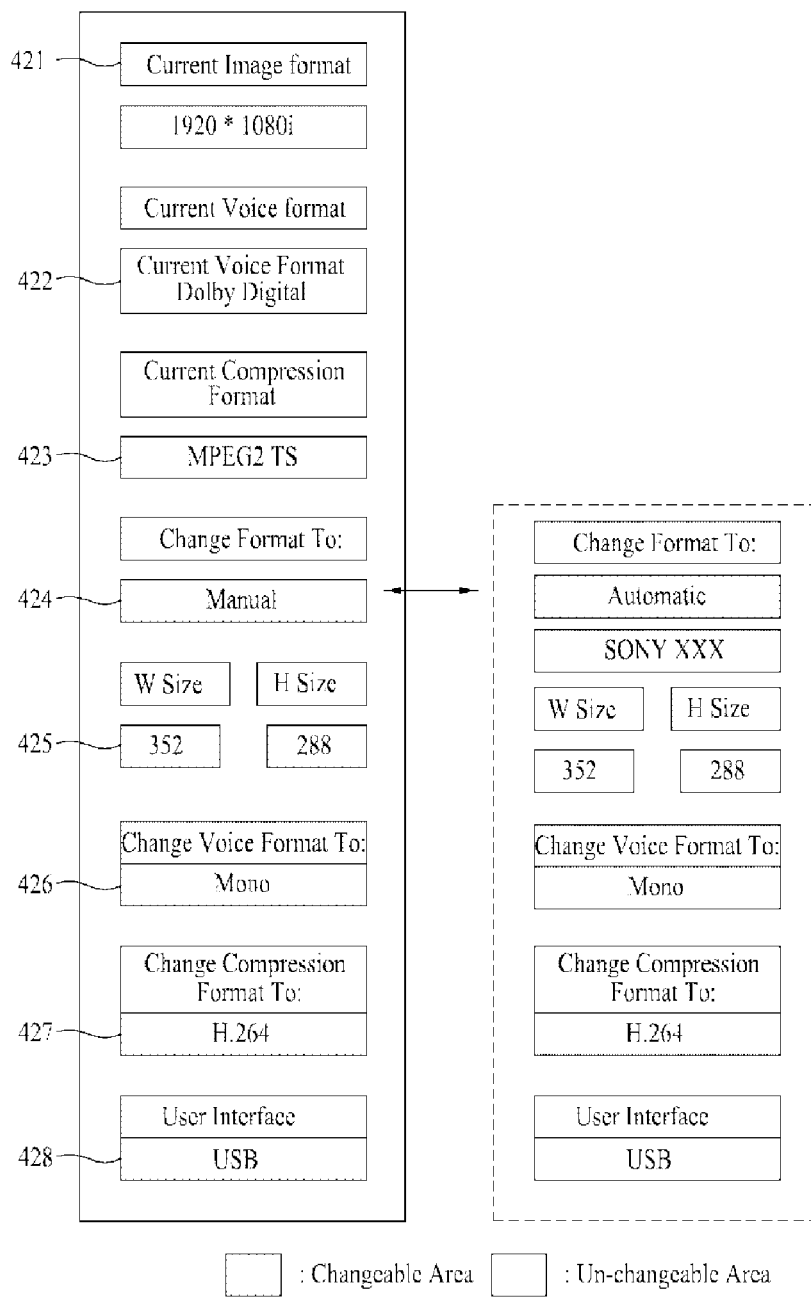
FIG. 6 illustrates the control panel illustrated on FIG. 4 with a different setting.

FIG. 6 illustrates the control panel illustrated on FIG. 4 with a different setting. It is possible to select manual or automatic format change. User can input desired format change parameters manually. Also, when the user put the format change to automatic and input the model name and number, the receiver automatically find corresponding pre-stored parameters.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

By converting a high resolution, large size image format of a broadcasting program to a low resolution, small size image format, a portable device including PDA, mobile pone and DMB can save and display the high definition television quality broadcasting programs.

The invention claimed is:

1. An apparatus for converting image data comprising:
an image converter to convert a first screen value of image data into a second screen value, wherein the first screen value corresponds to a screen of a display apparatus and the second screen value corresponds to a screen of an external device which is different from the screen of the display apparatus;
an encoder to encode the converted image data into a format that corresponds to the external device; and
a file system converter to change the encoded image data to correspond to a file system supported by an external interface coupled to the external device, wherein the file system converter changes the encoded image data into a data transfer format that corresponds to the external interface and wherein the data transfer format that corresponds to the external interface is different from the format that corresponds to the external device,
wherein:
the first and second values include a format type, width, height, aspect ratio or compression format parameter,
the screen of the display apparatus simultaneously displays three areas,
the first area includes image data displayed in the first screen value before conversion to the second screen value takes place,
the second area includes a preview window which shows the image data converted to the second screen value, and
the third area includes control information for changing or setting the second screen value.

2. The apparatus of claim 1, wherein the format type is selected from the group consisting of a manual format type and an automatic format type.

3. The apparatus of claim 2, wherein:
format type is designated based on information input by a user, and
when the format type is automatic, the input information includes a model name and a model number.

4. The apparatus of claim 1, wherein the apparatus includes or is coupled to the screen of the display apparatus and wherein the screen of the display apparatus displays at least one of a main screen, a preview window or a control panel.

5. The apparatus of claim 4, wherein the control panel includes a first area corresponding to an image format that includes the first screen value and a second area corresponding to a changeable format that includes the second screen value.

6. The apparatus of claim 5, wherein each of the first and second areas indicate or control at least one of a screen size or a compression format.

7. The apparatus of claim 1, wherein the external device is a mobile terminal.

8. The apparatus of claim 7, wherein the mobile terminal is a mobile phone, a personal digital assistant or digital multimedia broadcasting (DMB) device.

9. The apparatus of claim 1, wherein the external interface corresponds to at least one of a Universal Serial Bus (USB) interface, an Institute of Electrical and Electronics Engineers (IEEE) 1394 interface, or an Electronic Photo Field (EPF) interface.

10. The apparatus of claim 1, further comprising
a storage area to store the image data before or after conversion,
wherein the image data corresponds to a received broadcasting signal.

11. The apparatus of claim 1, wherein the apparatus is included within or coupled to a television receiver.

12. A method for converting image data comprising:
converting image data from a first screen value into a second screen value, wherein the first screen value corresponds to a screen of a display apparatus and the second screen value corresponds to a screen of an external device which is different from the screen of the display apparatus;
encoding the converted image data into a format that corresponds to the external device; and
changing the encoded image data into a data transfer format that corresponds to the external interface,
wherein:
the first and second values include at least one of format type, width, height, aspect ratio or compression format parameter,
the screen of the display apparatus displays three areas,
the first area comprises image data displayed in the first screen value before conversion to the second screen value takes place,
the second area comprises a preview window which shows the image data converted to the second screen value, and
the third area comprises control information for changing or setting the second screen value.

13. The method of claim 12, further comprising:
receiving a broadcast signal by a tuner,
wherein the image data is included in the broadcast signal.

14. The method of claim 13, further comprising
demodulating the broadcast signal.

15. The apparatus of claim 1, wherein the first screen value and the second screen value correspond to at least one of resolution or aspect ratio.

16. The apparatus of claim 15, wherein the second screen value is selected based on a signal generated from a user.

17. The method of claim 12, wherein the first screen value and the second screen value correspond to at least one of resolution or aspect ratio.

18. The apparatus of claim 6, wherein the first area indicates or controls a voice or sound format corresponding to the image data prior to conversion or encoding and the second area indicates or controls a voice or sound format corresponding to the image data after conversion or encoding.

* * * * *